May 13, 1969     MOTOI ISHIHARA     3,443,865

APPARATUS FOR THE TESTING AND MEASUREMENT OF VISUAL POWER

Filed Aug. 12, 1966

United States Patent Office 3,443,865
Patented May 13, 1969

3,443,865
APPARATUS FOR THE TESTING AND MEASUREMENT OF VISUAL POWER
Motoi Ishihara, 13 Shinonomecho,
Hiroshima-shi, Japan
Filed Aug. 12, 1966, Ser. No. 572,012
Claims priority, application Japan, Aug. 24, 1965,
40/51,569
Int. Cl. A61b 3/02
U.S. Cl. 351—31                        4 Claims

ABSTRACT OF THE DISCLOSURE

An apparatus for the testing and measurement of visual power in which a mark reading opening is provided at an upper central portion of the front wall of a casing and a shutter mechanism is disposed in the casing and is adapted to be opened by movement of an associated armature due to attraction towards an electromagnetic coil, a manually rotatable annular wheel being disposed inwardly of said shutter mechanism for detachably supporting on its outer peripheral face a plurality of equally spaced sight-testing marks, a planar counter of electrically insulating material being disposed in the casing and having a plate of conducting material on its lower face and a multiplicity of slots in suitably spaced relation in said counter and aligned with a linear main electrode extending axially on a rotatable cylinder having a multiplicity of distributing electrodes extending from said main electrode at positions directly below said slots and at right angles with respect to said main electrode, the electrodes having a length successively made longer from one end of said cylinder to the other such that a circuit is formed between the coil and a power supply including said conductive plate, a conductive plug inserted in one of the slots in the counter, the distributing electrode associated with such slot, and an electric circuit control means for intermittently causing full opening of said shutter mechanism.

---

Figure 1:
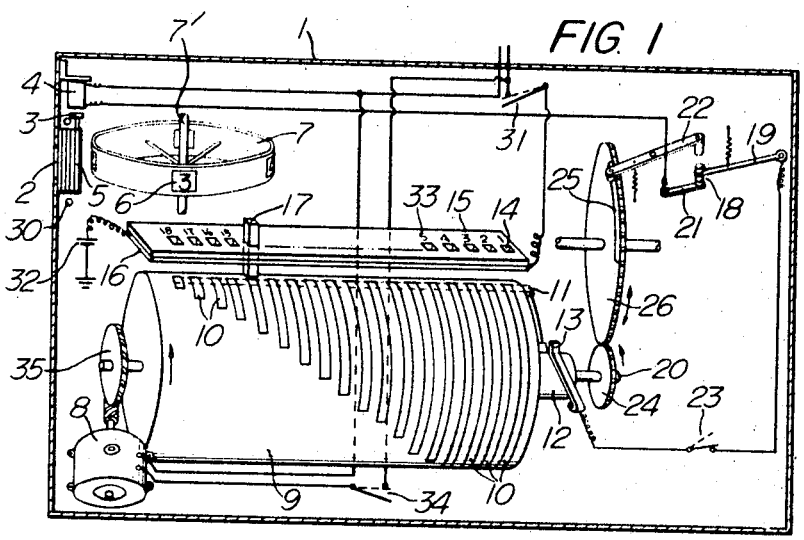

This invention relates to apparatus for the testing and measurement of visual power and more particularly to apparatus of the type described which can be used for the determination of speed of visual recognition of the eyes with respect to a moving body, that is, the faculty of accurately identifying a moving body.

It is the primary object of the present invention to provide an apparatus of the above character which establishes testing standards of visual power on the basis of which degrees of individual difference in visual power can be accurately determined by the discrimination of visual power among individuals.

According to the present invention, there is provided an apparatus for the testing and measurement of visual power characterized by a structure comprising a casing, a mark reading opening provided at an upper central portion of the front wall of said casing, a shutter mechanism disposed inside of said mark reading opening and arranged to be opened by movement of an associated armature due to attraction towards an electromagnetic coil, an annular wheel disposed inwardly of said shutter mechanism for detachably mounting on its outer peripheral face a plurality of equally spaced sight-testing marks, said annular wheel being mounted on a vertical shaft for manual rotation, a planar counter of electrically insulating material disposed in the central space in said casing, a plate of conducting material fixed to the lower face of said counter, a multiplicity of aligned slots bored in suitably spaced relation through said counter and said conductive plate for vertically receiving a conductive plug in one of them, a series of numerical figures stamped one for each slot on the upper face of said counter, a distribution control cylinder of electrically insulating material horizontally, axially, and parallelly disposed below said counter and arranged for rotation from a motor through a reduction gearing, said cylinder carrying on its outer peripheral face a linear main electrode running in the axial direction of said cylinder and a multiplicity of distributing electrodes extending from said main electrode at positions directly below said slots and at right angles with respect to said main electrode, said distributing electrodes having a number and spacing the same as those of said slots and having their length successively made longer from one end of said cylinder to the other, means for connecting a source of power supply to said electromagnetic coil by way of a circuit including said conductive plate, said conductive plug and said distributing electrodes, and electric circuit control means interposed in said circuit for intermittently causing full opening of said shutter mechanism.

An important feature of the present invention is that visual acuity, being one of the major factors of visual faculty, is first determined, and on the basis of the visual acuity so determined, rapidity of identification of moving objects is then measured to determine the other major factors of visual faculty, that is, the speed of visual recognition of eyes with respect to the moving objects so that these two values derived in the form of simple figures can compositely and clearly give a measure by which we may judge the difference of visual faculty between individuals. This composite visual faculty is especially important because a man whose eyes have a higher speed of visual recognition than the speed at which an object in the field of vision makes an instantaneously abrupt change during its movement can sufficiently, easily and accurately recognize such object moving across the field of vision. The apparatus of the invention can thus measure the visual recognition faculty of a man for both cases in which an object is moving relative to the viewer and in which the viewer himself is rapidly moving relative to an object.

The apparatus having the feature as described above is especially suitable for the testing and measurement of visual faculty of persons, such as aircraft pilots and drivers of marine and land high-speed transportation means, who must correctly observe any rapid and instantaneous variation in the movement of any object in their field of vision and are required to deal with such variation for the safety of passengers, etc. Needless to say, traffic accidents can be prevented or at least minimized by the selective employment of persons having excellent visual recognition faculty as determined by the apparatus of the invention. Moreover, effective utilization of the apparatus of the invention in occupations which require sharp eye sight including players and umpires in sports such as baseball, tennis, etc., typists, typesetters, abacus operators, and the like extends numerous contributions towards the safe prosecution, accuracy, improved precision and quickness of the work.

Other objects, advantages and features of the present invention will become apparent from the following description with reference to the accompanying drawings, in which:

FIG. 1 is a diagrammatic side elevational view showing the internal component arrangement in the apparatus according to the invention; and FIG. 2 is a diagrammatic view of a shutter mechanism, in which *a* shows the shutter mechanism in its closed position and *b* shows the mechanism in its open position.

Referring to FIG. 1, the apparatus according to the invention includes a metal casing 1, which has an upper central portion of its front wall cut out to provide a square-shaped opening 2 through which an examinee reads sight-testing marks 6. A door is provided at the upper portion of one of the side walls to give access to an operation chamber in the casing 1.

A shutter mechanism 5 similar to that used in a camera is disposed inside of the reading opening 2 and is operatively connected to an actuating lever 37. The lever 37 is pivotally connected to an armature 3 as shown in FIG. 2 so that, upon attraction of the armature 3 towards an electromagnetic coil 4, the lever 37 undergoes a swinging movement to mechanically open the shutter elements by means of a connecting rod for thereby allowing an examinee to read the sight-testing marks 6 through the opening 2.

An annular wheel 7 is disposed in the operation chamber at a position inside the shutter mechanism 5 and is mounted on a vertical shaft 7' for manual rotation. A plurality of sight-testing mark support frames are provided in equally spaced relation on the outer peripheral face of the annular wheel 7 so that the sight-testing marks 6 can be easily detachably mounted thereon. It will be seen that the sight-testing marks 6 can thus be successively brought to a position opposite the reading opening 2 by the manual rotation of the wheel 7 and can be easily and accurately viewed by an examinee when the shutter mechanism 5 is driven to its fully opened position.

The sight-testing marks 6 consist of white, flat, square-shaped plates of acrylic resin or like material whose front faces are engraved with individual letters or symbols of the kind and shape as those used in universal sight-testing charts and black paint is deposited in the engraved portions so that the black letter or symbol on each plate can be distinctly seen against the white background. These marks 6 are provided in units of different sizes each including more than ten different letters or symbols of uniform size. To provide means for identifying the marks belonging to the same unit, an identification sign such, for example, as a figure 0.8 or 1.0 is indicated on the rear face of each mark of the same unit.

A planar counter 15 of electrically insulating material is horizontally disposed below the operation chamber in the casing 1 and a plate 16 of electrically conductive material is fixed to the lower face of the counter 15 in a manner to cover the entire lower face of the counter 15. A multiplicity of aligned slots 14 are bored in suitably spaced relation through the counter 15 and plate 16 for vertically receiving a conductive plug 17 therein. These slots 14 are stamped with a series of numerical figures 33 shown as 1, 2, . . ., 18 to give clear indication of results of measurement on speed of visual recognition.

A distribution control cylinder 9 of electrically insulating material is horizontally disposed below the counter 15 in the casing 1 with its axis parallel with the longitudinal direction of the counter 15. The distribution control cylinder 9 is adapted for being driven in rotation from an electric motor 8 through a reduction gearing 35 and the cylinder 9 is peripherally provided with a linear main electrode 11 running in the axial direction of the cylinder 9. A multiplicity of distributing electrodes 10 of successively greater length extend from the main electrode 11 at positions directly below the slots 14 and at right angles with respect thereto and the number and spacing of the electrodes 10 are the same as those of the slots 14. It will, therefore, be seen that, when the conductive plug 17 is placed in the slot 14, the power source 31, the conductive plate 16 and the distributing electrode 10 are electrically connected to form an electromagnetic circuit, so that the shutter 5 is opened fully enabling the examinee to read the sight-testing mark. In this case, the duration of the full opening of the shutter (duration of visual recognition) is accurately controlled by the length of the particular distribution electrode 10, and the examinee is allowed to read the sight-testing mark during this period. Namely, the shutter opening time controlled by the length of the electrode represents the speed at which the examinee reads the sight-testing mark and thus the speed of visual recognition can be measured with accuracy. The shorter the mark identifying time (the length of the electrode), the better the visual recognition faculty of the examinee.

Figure 2A:
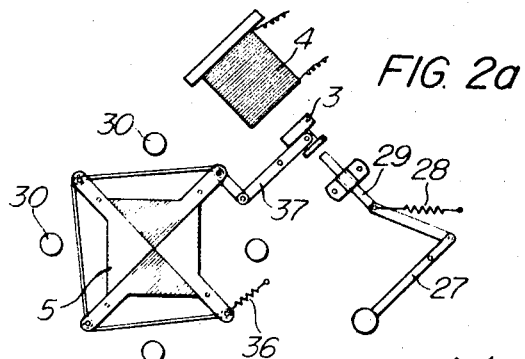
Figure 2B:
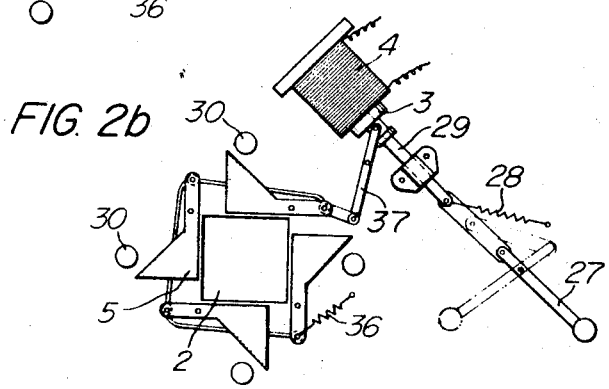

One end of the main electrode 11 on the cylinder 9 is electrically connected to the shaft of the cylinder 9 and further to a brush 13 through said cylinder shaft, so that a current is conducted to the electrode 11 constantly during rotation of the cylinder. An electric circuit control device is interposed in a circuit leading from the brush 13 to the electromagnetic coil 4 and includes a driving gear 24 fixed to the end of the shaft of the cylinder 9. A driven gear 26 is in mesh with the gear 24 and has such a diameter that its rotation is reduced to one fifth the rotation of the gear 24. A control cam strip 25 is provided adjacent to the peripheral edge of the gear 26 so as to extend over an arc of about one fifth the gear circumference and is adapted to be contacted by the left end of an actuating arm 22 whose right end is opposed by a contact 18 to intermittently urge the same towards an opposite contact to make and break the electrical circuit to the electromagnetic coil 4. The contact 18 is supported on a pivotal bar 19 electrically connected with the brush 13, while the opposite contact is supported on a stationary bar 21. By the above arrangement, because one rotation of gear 26 equals five rotations of gear 24, the circuit to the electromagnetic coil 4 is completed by every one rotation of gear 26 during five rotations of the cylinder 9 to energize the electromagnetic coil 4 which therefore attracts the armature 3 so that the shutter mechanism 5 is mechanically urged to its fully opened position as shown in FIG. 2b. During the remaining four rotations of the cylinder 9, the contact 18 is kept in its open position and the shutter mechanism 5 remains in its fully closed position as shown in FIG. 2a.

Interposition of the above-described electric circuit control device in the electromagnetic coil energizing circuit is especially useful because it ensures intermittent full opening of the shutter mechanism and allows for stable reading of the marks without any sense of flickering for the eye, thus leading to precise and correct testing. The usefulness of the control device is readily apparent from supposition of absence of such device. In such a case, the brush 13 directly feeds the electromagnetic coil 4 and, due to considerably quick rotation of the cylinder 9 and continuous current supply from a main isolator switch 31, the shutter mechanism 5 will be continuously kept at a substantially fully closed state when the plug 17 is situated in a region including the distributing electrodes 10 of short lengths (the left end of cylinder 9 in FIG. 1), while the shutter mechanism 5 will be continuously opened and closed at equal intervals in a region including the distributing electrodes 10 of intermediate lengths. On the other hand, the shutter mechanism 5 will be continuously kept at a substantially fully opened state in the region of the distributing electrodes 10 of large lengths. Continuation of such states gives rise to an erroneous vision due to a sense of flickering or dazzling for the eye and eventually brings forth impossibility of proper testing.

In testing the visual acuity solely, a mechanism as shown in FIG. 2 may be used. This mechanism comprises a push rod 29 for advancing the armature 3 towards its shutter opening position and a shutter actuating handle 27 connected to the push rod 29 for causing advancing and retracting movement of the rod 29. The retracting movement of the rod 29 is assisted by a spring 28.

A plurality of lamps 30 are provided to illuminate the marks 6. Electrical power supply to the apparatus is made through the main isolator switch 31, and an on-off switch 34 is also interposed in the circuit to the motor 8, while one end of the conductive plate 16 is grounded through a capacitor 32. Numeral 36 represents a spring to close the shutter mechanism.

In the test of visual power and speed of visual recognition, a 5-meter horizontal spacing must be normally maintained between the eye of an examinee and the mark and the mark must be correctly illuminated. At first, visual acuity of an examinee should be determined by the visual power test. In this case, the cylinder 9 and associated means are held from rotation and the shutter actuating handle 27 is urged to the position as shown in FIG. 2b to keep the shutter mechanism 5 in its full open position. Then those marks of the same unit but of different shapes, which may be suitable for a particular examinee, are mounted on the annular wheel 7 and are rotated one after another to successively bring the marks in front of the reading opening. The examinee is requested to read each mark in a considerably short period of time of the order of 1 to 1.5 seconds to determine his visual power. If he fails to correctly read all of the marks 6 on the wheel 7 within the specified time, then marks of increased size of another unit may be mounted on the wheel 7 until he can correctly read all of the marks. The unit the examinee can correctly read thus determines his visual acuity.

After the determination of the basic visual acuity of the particular examinee, the test on speed of visual recognition can now be conducted on the basis of the visual acuity so determined. In this test, the marks must have the same size as the unit which determined his visual acuity, however marks of different shapes are preferred. In the test for determining the speed of visual recognition, the shutter actuating handle 27 is changed over to the position as shown in FIG. 2a to urge the shutter mechanism 5 to its fully closed position by the action of a spring 36. Then, while continuously rotating the cylinder 9 in the direction of arrow by the motor 8, the conductive plug 17 may be inserted in one of the slots 14. This completes the electromagnetic coil energizing circut extending from the main isolator switch 31, conductive plate 16, conductive plug 17, distributing electrode 10 and electric circuit control device to the elecromagnetic coil 4 to thereby mechanically open and close the shutter mechanism 5. During the instantaneous full opening period of the shutter mechanism 5, the examinee is requested to read the mark in front of him.

In the visual recognition test, the conductive plug 17 is at first inserted in the slot 14 at the left-hand extremity, that is, the slot 14 corresponding to the shortest electrode 10 and is successively transferred towards the right until a point is reached at which the examinee can correctly recognize and read the mark. When a slot stage at which the examinee can give correct response is reached, the conductive plug 17 is kept at such slot stage and other marks of different shapes are mounted on the wheel 7 and are successively rotated to test the examinee's response to such marks. If the examinee cannot give a correct reading, rotation of the marks on the annular wheel 7 is ceased and the conductive plug 17 is displaced into an adjacent slot 14 for repetition of similar manner of testing. Finally, the slot stage at which the examinee can correctly recognize and read all of the marks on the annular wheel 7 is reached and this stage is taken as the speed of visual recognition of the examinee. The speed of visual recognition can be numerically represented by the figure 33, for example 15 or 16, stamped on the counter 15 at a position adjacent the particular slot 14 receiving therein the plug 17. The slot stages are so selected and arranged that sharpness or rapidity of response of visual recognition which is variable depending on individuals can be precisely and correctly distinguished and detected and the value obtained after measurement can give clear indication as to how fast one can recognize a moving object.

What I claim is:

1. An apparatus for the testing and measurement of visual power comprising a casing, a mark reading opening provided at an upper central portion of the front wall of said casing, a shutter mechanism disposed inside of said mark reading opening and arranged to be opened by movement of an associated armature due to attraction towards an electromagnetic coil, an annular wheel disposed inwardly of said shutter mechanism for detachably mounting on its outer peripheral face a plurality of equally spaced sight-testing marks, said annular wheel being mounted on a vertical shaft for manual rotation, a planar counter of electrically insulating material disposed in the central space in said casing, a plate of conducting material fixed to the lower face of said counter, a multiplicity of aligned slots in suitably spaced relation in said counter and said conductive plate for vertically receiving a conductive plug in one of them, a series of numerical figures one for each slot on the upper face of said counter, a distribution control cylinder of electrically insulating material disposed horizontally and parallel below said counter and adapted for being driven in rotation from a motor through a reduction gearing, said cylinder carrying on its outer peripheral face a linear main electrode running in the axial direction of said cylinder and a multiplicity of distributing electrodes extending from said main electrode at position directly below said slots and at right angles with respect to said main electrode, said distributing electrodes being present in a number and spacing the same as those of said slots and having a length successively longer from one end of said cylinder to the other, means for connecting a source of electrical power supply to said electromagnetic coil by way of a circuit including said conductive plate, said conductive plug and said distributing electrodes, and electric circuit control means interposed in said circuit for intermittently causing full opening of said shutter mechanism.

2. An apparatus for the testing and measurement of visual power according to claim 1, in which said sight-testing marks consist of white, flat, square-shaped plates whose front faces are engraved with individual characters of the kind and shape as those used in the universal sight-testing chart and black paint is deposited in the engraved portions to provide black characters on white backgrounds, said marks being prepared in more than ten units of different sizes of characters, each unit including different characters of uniform size, and an identification sign being provided on the rear face of each said mark to indicate the unit to which said mark belongs.

3. An apparatus for the testing and measurement of visual power according to claim 1, in which said means for connecting said power source to said electromagnetic coil includes a conducting ring mouted on one end of the shaft of said distribution control cylinder and connected to one end of said main electrode and a brush in sliding contact with said conducting ring.

4. An apparatus for the testing and measurement of visual power according to claim 1, in which said electric circuit control means includes a make-break contact actuated by a cam for the intermittent full opening of said shutter mechanism.

References Cited

UNITED STATES PATENTS 1,526,781   2/1925   Ferree et al. _____ 351—31
3,237,205   3/1966   Claudel.

DAVID SCHONBERG, *Primary Examiner.*

PAUL A. SACHER, *Assistant Examiner.*